US011576150B2

(12) United States Patent
Bian et al.

(10) Patent No.: US 11,576,150 B2
(45) Date of Patent: Feb. 7, 2023

(54) CHANNEL ALLOCATION METHOD, GATEWAY, AND TERMINAL DEVICE

(71) Applicant: BOE TECHNOLOGY GROUP CO., LTD., Beijing (CN)

(72) Inventors: Yi Bian, Beijing (CN); Kejun Hu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/239,728

(22) Filed: Apr. 26, 2021

(65) Prior Publication Data

US 2022/0095275 A1 Mar. 24, 2022

(30) Foreign Application Priority Data

Sep. 24, 2020 (CN) .......................... 202011019231.9

(51) Int. Cl.
H04W 72/02 (2009.01)
H04W 72/04 (2009.01)

(52) U.S. Cl.
CPC ....... *H04W 72/02* (2013.01); *H04W 72/0473* (2013.01)

(58) Field of Classification Search
CPC ............... H04W 28/26; H04W 74/006; H04W 72/042; H04W 72/006; H04W 72/04; H04W 72/044; H04W 72/0413; H04W 72/0406; H04W 72/0453
See application file for complete search history.

(56) References Cited

U.S. PATENT DOCUMENTS

| | | | | |
|---|---|---|---|---|
| 6,097,717 A | * | 8/2000 | Turina | H04W 4/08 370/348 |
| 8,259,745 B2 | * | 9/2012 | Gong | H04L 43/0811 370/445 |
| 2002/0172186 A1 | * | 11/2002 | Larsson | H04W 52/54 370/349 |
| 2006/0040671 A1 | * | 2/2006 | Takarabe | H04W 72/06 455/425 |
| 2007/0002821 A1 | * | 1/2007 | Carlson | H04L 67/61 370/349 |
| 2007/0019596 A1 | * | 1/2007 | Barriac | H04L 1/1867 370/338 |
| 2010/0008347 A1 | * | 1/2010 | Qin | H04W 74/04 370/345 |
| 2012/0163181 A1 | * | 6/2012 | Xue | H04W 52/383 370/241 |
| 2016/0277973 A1 | * | 9/2016 | Luo | H04W 28/26 |
| 2020/0100210 A1 | * | 3/2020 | Vaidya | H04W 68/02 |

FOREIGN PATENT DOCUMENTS

| | | |
|---|---|---|
| CN | 102413577 A | 4/2012 |
| CN | 106533518 A | 3/2017 |

* cited by examiner

*Primary Examiner* — Ricardo H Castaneyra
(74) *Attorney, Agent, or Firm* — Fay Sharpe LLP

(57) ABSTRACT

A channel allocation method includes: determining a second channel among idle channels in response to a communication request received from a terminal device over a first channel; and broadcasting a reservation message over the first channel, wherein the reservation message includes second channel information and a reserved communication period, the second channel information is information about the second channel, and the reserved communication period is a time period in which the terminal device is allowed to communicate with the gateway.

15 Claims, 3 Drawing Sheets

CHANNEL ALLOCATION METHOD, GATEWAY, AND TERMINAL DEVICE

CROSS-REFERENCE TO RELATED APPLICATIONS

This application is based on and claims priority to Chinese Patent Application No. 202011019231.9, filed on Sep. 24, 2020 and entitled "CHANNEL ALLOCATION METHOD, GATEWAY, AND TERMINAL DEVICE," the disclosure of which is herein incorporated by reference in its entirety.

TECHNICAL FIELD

The present disclosure relates to the technical field of communications, and in particular, to a channel allocation method, a gateway, and a terminal device.

BACKGROUND

With the development of the Internet of things (IoT) technologies, an increasing number of devices are supporting wireless communication. According to the basic principles of wireless communication, only one transmitter device is allowed to transmit data under conditions of the same moment, the same modulation scheme, and the same frequency in a limited space. Otherwise, mutual interference occurs, and thus communication quality is greatly reduced. In this case, a method for appropriately allocating channel resources is required for avoiding communication conflicts.

SUMMARY

Embodiments of the present disclosure provide a channel allocation method, a gateway, and a terminal device.

At least one embodiment of the present disclosure provides a channel allocation method applicable to a gateway. The method includes: determining a second channel among idle channels in response to a communication request received from a terminal device over a first channel; and broadcasting a reservation message over the first channel, wherein the reservation message includes second channel information and a reserved communication period; wherein the second channel information is information about the second channel, and the reserved communication period is a time period in which the terminal device is allowed to communicate with the gateway.

In some embodiments, the method further includes: returning the reservation message to the terminal device over the first channel.

In some embodiments, the reservation message includes an identifier of the terminal device.

In some embodiments, before the determining a second channel among idle channels, the method further includes: determining whether an idle channel exists currently; and returning a reservation failure message to the terminal device in response to determining that no idle channel exists.

In some embodiments, the method further includes: communicating with the terminal device over the second channel in response to a start of the reserved communication period.

In some embodiments, broadcasting the reservation message over the first channel includes: broadcasting the reservation message over the first channel at a first transmit power; communicating with the terminal device over the second channel includes: communicating with the terminal device over the second channel at a second transmit power; wherein the first transmit power is greater than the second transmit power.

In some embodiments, the first transmit power is at least 6 dBm greater than the second transmit power.

In some embodiments, the method further includes: broadcasting a message about release of the second channel over the first channel in response to an expiration of the reserved communication period.

In some embodiments, broadcasting the message about release of the second channel over the first channel includes: broadcasting the message about release of the second channel over the first channel at a third transmit power; wherein the third transmit power is greater than the second transmit power.

In some embodiments, the third transmit power is at least 6 dBm greater than the second transmit power.

In some embodiments, broadcasting the message about release of the second channel over the first channel includes: broadcasting the message about release of the second channel over the first channel for a plurality of times.

In some embodiments, broadcasting the reservation message over the first channel includes: broadcasting the reservation message over the first channel for a plurality of times.

In some embodiments, the method further includes: receiving a reservation message from another gateway; determining a third channel and a reserved communication period of the third channel based on the reservation message from the another gateway, wherein the third channel is a channel occupied by the another gateway; and determining the third channel as an idle channel in response to receiving no message about release of the third channel within a predetermined duration upon expiration of the reserved communication period of the third channel.

In some embodiments, the method further includes: updating an idle channel list, wherein the idle channel list records one of: an identifier of an idle channel; or an idle period and a non-idle period of each channel.

At least one embodiment of the present disclosure provides a channel allocation method applicable to a terminal device. The method includes: sending a communication request to a gateway over a first channel; and receiving, over the first channel, a reservation message broadcast by the gateway, wherein the reservation message includes second channel information and a reserved communication period; wherein the second channel information is information about a second channel, the reserved communication period is a time period in which the terminal device is allowed to communicate with the gateway, and the second channel is determined from idle channels by the gateway.

At least one embodiment of the present disclosure provides a gateway. The gateway includes: a memory, configured to store a set of instructions; and at least one processor, configured to execute the set of instructions to perform the method applicable to the gateway as described above.

At least one embodiment of the present disclosure provides a terminal device. The terminal device includes: a memory, configured to store a set of instructions; and at least one processor, configured to execute the set of instructions to perform the method applicable to the terminal device as described above.

At least one embodiment of the present disclosure provides a communications system. The communication system includes: at least one gateway and at least one terminal device as described above.

At least one embodiment of the present disclosure provides a non-transitory computer-readable storage medium storing at least one of program code. The program code, when loaded and executed by a processor, causes the processor to perform the channel allocation method applicable to the gateway or the terminal device as described above.

DETAILED DESCRIPTION

For clearer descriptions of the objectives, technical solutions, and advantages of the present disclosure, the present disclosure is described in further detail hereinafter with reference to specific embodiments and accompanying drawings.

It should be noted that, unless otherwise defined, the technical and scientific terms used in the present disclosure are as they are usually understood by those skilled in the art to which the disclosure pertains. The terms "first," "second," and the like used herein in this text do not denote any order, quantity or importance, but are merely intended to distinguish between different constituents. The terms "comprise," "include," and derivatives forms thereof mean that elements or articles appearing before "comprise" or "include" or their derivative forms include the elements or articles and their equivalent elements appearing behind "comprise" or "include" or their derivative forms, not excluding any other elements or articles.

Figure 1:
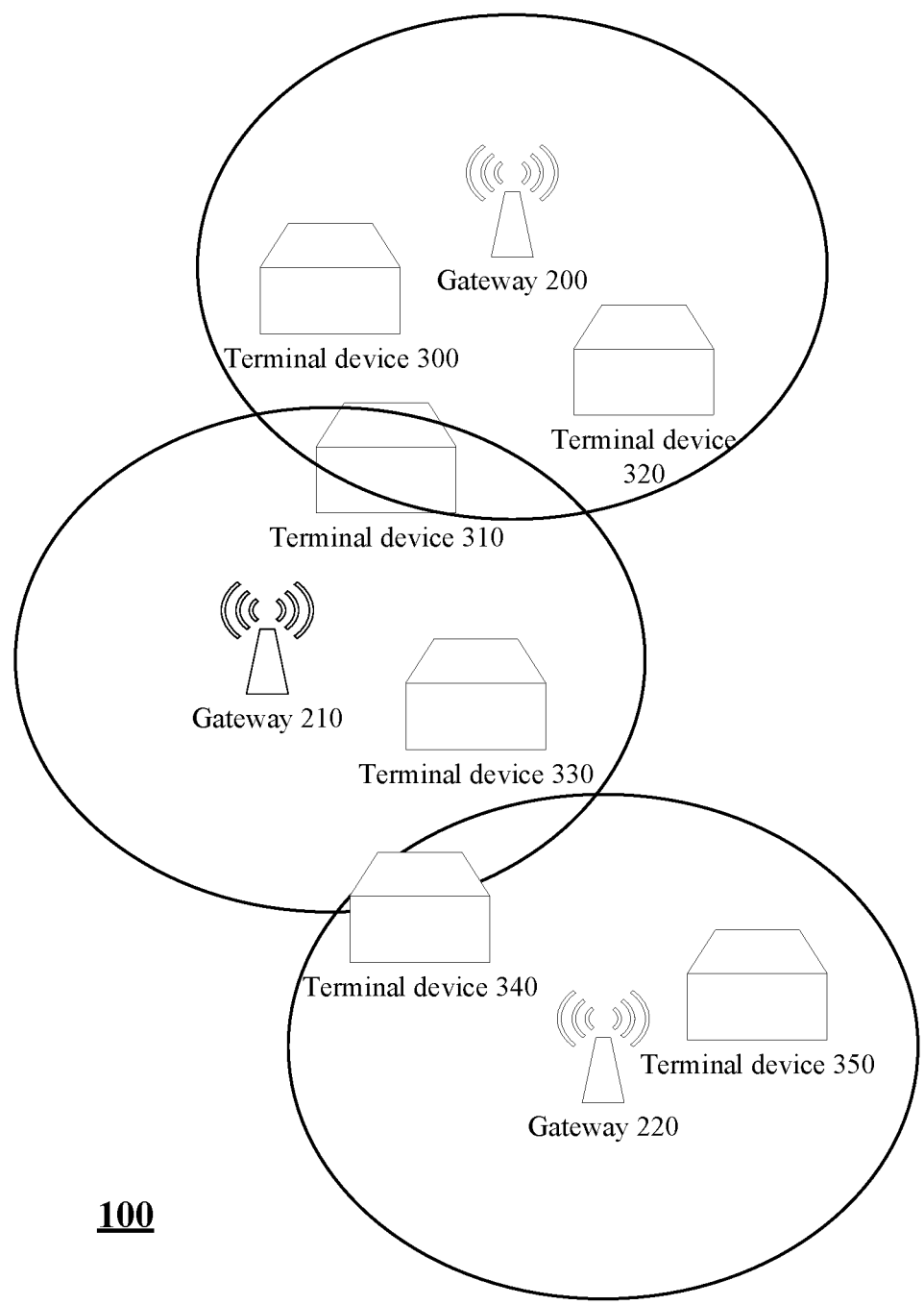
FIG. 1 is a schematic diagram of a communications system.

FIG. 1 is a schematic diagram of a communications system. As shown in FIG. 1, the communications system 100 may include gateways 200/210/220 and terminal devices 300/310/320/330/340/350.

As an example, the gateway 200 may select a communication channel and broadcast a message over the channel. The broadcast message may be received by a terminal device or another gateway in the communication range of the gateway 200, for example, may be received by the terminal devices 300, 310, and 320 and the gateway 210.

The gateway 200 may further receive a message over the communication channel. For example, the gateway 200 may receive messages from the terminal devices 300, 310, and 320 and the gateway 210 in the communication range of the gateway 200.

The terminal devices 330, 340, and 350 and the gateway 220 are incapable of directly communicating with the gateway 200 because these devices are beyond the communication range of the gateway 200. However, these devices are still capable of indirectly communicating with the gateway 200, for example, by message forwarding by the gateway 210. Details are not given herein.

As an example, when the terminal device 310 is in the communication range of a certain gateway, the terminal device is capable of communicating with the corresponding gateway. For example, the terminal device is capable of communicating with the gateway 200 or the gateway 210.

The terminal device 310 is incapable of directly communicating with the gateway 220 because the terminal device 310 is beyond the communication range of the gateway 220. However, the terminal device 310 is still capable of indirectly communicating with the gateway 220, for example, by message forwarding by the gateway 210. Details are not given herein.

One gateway usually communicates with only one terminal device at a fixed moment and frequency using a fixed modulation scheme. Communication channels need to be allocated to prevent signal interference.

In related technologies, commonly used allocation methods are time division multiplexing (TDM), frequency division multiplexing (FDM), code division multiple access (CDMA), and the like.

A TDM system occupies only one channel, but its communication efficiency is low with a plurality of devices taking turns to occupy channels for communication. Therefore, the TDM system is suitable only for a scenario with a high over-the-air data rate or a small amount of data.

An FDM system simultaneously occupies a plurality of channels, and a separate frequency is allocated for each group of communication. Therefore, the FDM system delivers high communication efficiency. However, channels are severely wasted, and many channel resources are occupied.

A CDMA system features complicated modulation and demodulation and requires more hardware resources, resulting in relatively high power consumption and costs.

An embodiment of the present disclosure provides a channel allocation method applicable to a gateway.

The method includes: determining a second channel among idle channels is determined in response to a communication request received from a terminal device over a first channel; and broadcasting a reservation message over the first channel, wherein the reservation message includes second channel information and a reserved communication period; wherein the second channel information is information about the second channel. The reserved communication period is a time period in which the terminal device is allowed to communicate with the gateway.

An embodiment of the present disclosure further provides a channel allocation method applicable to a terminal device.

The method includes: sending a communication request is sent to a gateway over a first channel; receiving reservation message broadcast by the gateway receive over the first channel, wherein the reservation message includes second channel information and a reserved communication period; wherein the second channel information is information about a second channel, the reserved communication period is a time period in which the terminal device is allowed to communicate with the gateway, and the second channel is determined from idle channels by the gateway.

In the embodiments of the present disclosure, the gateway receives the communication request and broadcasts the reservation message over the first channel, and communicates with the terminal device in the reserved communication period over another idle channel (such as the second channel). When a plurality of terminal devices need to communicate, the gateway may select a plurality of second channels from the idle channels and separately allocate the second channels to the terminal devices for communication with the gateway. Therefore, this method may be employed to implement multi-channel communication and improve communication efficiency. Each second channel may be used by different terminal devices in different time periods.

Channel resources may be appropriately used by the terminal devices without causing excessive occupation and waste of channel resources. In addition, channels are automatically coordinated based on an idle/non-idle state, and does not need to be manually grouped or coordinated together by the server. This reduces the difficulty in network deployment, better implements channel allocation, and alleviates communication interference.

Figure 2:
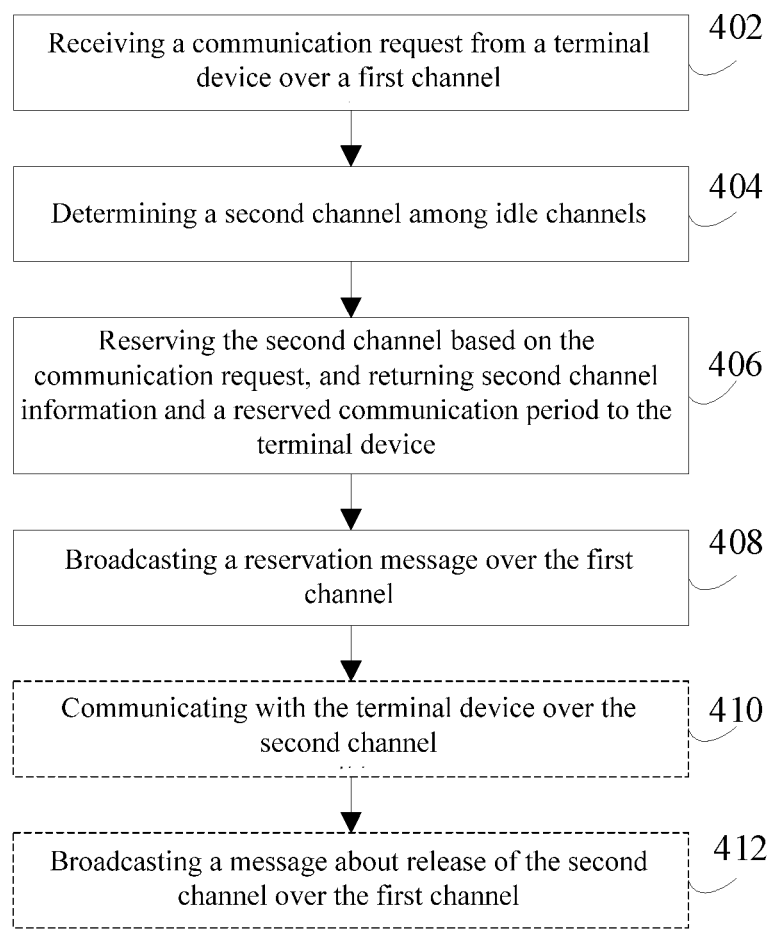
FIG. 2 is a schematic flowchart of a channel allocation method according to an embodiment of the present disclosure.

FIG. 2 is a schematic flowchart of a channel allocation method according to an embodiment of the present disclosure.

As shown in FIG. 2, the channel allocation method is applicable to a gateway (for example, the gateway 200) and includes the following processes.

In 402, a communication request is received from a terminal device (for example, terminal device 300) over a first channel.

In this process, when communication is desired, the terminal device 300 initiates a communication request to the gateway 200 over the first channel. The gateway receives the communication request from the terminal device over the first channel.

As an example, the terminal device 300 and the gateway 200 perform a handshake first. Then the gateway 200 determines a communication requirement of the terminal device 300 based on the communication request from the terminal device 300. If the terminal device 300 does not initiate a communication request after the handshake, channel reservation may not be performed.

It should be noted that, in some embodiments, the communication request described in this process is only a request sent when the terminal device initiates a communication requirement, rather than a request from the terminal device during actual communication. When a reserved communication period starts, an actual communication request of the terminal device is sent over a channel reserved by the gateway for the terminal device. The actual communication request is sent to the gateway over the reserved channel.

In some embodiments, available channels may be grouped into one primary channel and several auxiliary channels. These channels are relatively independent of each other without mutual interference.

In some embodiments, the first channel serves as the primary channel, which is mainly used by the gateway 200 in receiving communication requests from the terminal devices 300, 310, and 320, broadcasting corresponding reservation messages and release messages, and receiving reservation messages and release messages from another gateway (for example, the gateway 210).

In response to a start of the communication, the gateway 200 interacts with the terminal device 300 over the primary channel, and the gateway 200 receives the communication request of the terminal device 300.

In 404, a second channel among idle channels is determined.

In this process, the idle channel is an unoccupied channel. To be specific, no terminal device and gateway communicate over the channel. Optionally, the idle channel may be recorded in an idle channel list. That is, the idle channel list records a list of channels that are available for channel allocation. In an optional embodiment, the idle channel list is updated based on channel reservation and release states of the gateway and channel reservation and release states of another gateway.

In this process, the gateway 200 may randomly select a channel from the idle channels as the second channel, or may select a channel as the second channel based on a preset selection rule. An implementation method may be set as required. Details are not provided herein.

In 406, the second channel is reserved based on the communication request, and second channel information and a reserved communication period are returned to the terminal device.

In this embodiment of the present disclosure, reservation means granting the right of using the second channel in a period of time to a certain terminal device. For a gateway, a reservation action is represented as updating an idle channel list of the gateway. For example, the second channel is deleted from the idle channel list, or at least one of an idle period and a non-idle period of the second channel is changed in the idle channel list.

In this process, the second channel information is information related to the second channel, for example, a frequency band corresponding to the second channel and a frequency that meets a preset condition. The reserved communication period may be a certain period of time in the future, or a period of time starting from the current moment. The reserved communication period includes a start time point (that is, a time point at which the reserved communication period starts) and an end time point (that is, a time point at which the reserved communication period expires). The preset condition may be set as required.

In another embodiment of the present disclosure, in response to reserving the second channel, the gateway may not perform the action of "returning second channel information and a reserved communication period to the terminal device."

In 408, a reservation message is broadcast over the first channel, wherein the reservation message includes the second channel information and the reserved communication period.

In this process, upon completion of the reservation on the second channel, the gateway 200 broadcasts the reservation message over the first channel to notify another gateway (for example, the gateway 210) and declare the channel occupied.

In some embodiments, the reservation message may be received only by another gateway (for example, the gateway 210) in the communication range of the gateway 200. The communication range of the another gateway overlaps the communication range of the gateway 200. Therefore, if the two gateways use the same channel for communication, signal interference occurs. The communication range of a gateway (for example, the gateway 220) that is beyond the communication range of the gateway 200 does not overlap the communication range of the gateway 200. Therefore, the two gateways may use the same channel for communication, and signal interference is not easy to occur.

In some embodiments, in response to receiving the reservation message, the another gateway (for example, the gateway 210) lists the corresponding second channel as a non-idle channel. When performing channel reservation, the another gateway does not select the second channel for reservation. Another gateway (for example, the gateway 220) that does not receive the reservation message does not list the second channel as a non-idle channel because the gateway 200 reserves the second channel. (For example, it is possible that the gateway 220 reserves the second channel and makes it a non-idle channel.)

In some embodiments, the gateways synchronize channel occupation information (determined based on reservation messages and release messages) over the first channel (that is, the primary channel) in real time.

In some embodiments, the gateway 200 broadcasts the reservation message over the first channel at a relatively high transmit power that is usually 6 dBm greater than the transmit power of a normal signal, such that another gateway is capable of receiving the reservation message.

In some embodiments, the reservation message may be broadcast over the first channel in the following way.

The reservation message is broadcast over the first channel for a plurality of times at a relatively high transmit power, such that another gateway (for example, the gateway 210) in the communication range of the gateway 200 is capable of receiving the reservation message. In this way, a gateway incapable of receiving the broadcast is not interfered by the communication and may still use the channel.

In some embodiments, after the reservation message is broadcast over the first channel for a plurality of times, the transmit power of the gateway 200 may be lowered to a normal signal level.

In some embodiments, after the reservation message is broadcast over the first channel for a plurality of times, the second channel may be deleted from the idle channel list or the non-idle period of the second channel may be specified in the idle channel list.

In another embodiment of the present disclosure, when the terminal device also receives a broadcast message, the foregoing reservation message may also be received by the terminal device. In an optional implementation, the reservation message further includes the identifier of the terminal device. In this case, in 406, the gateway may not perform the action of "returning second channel information and a reserved communication period to the terminal device." The identifier of the terminal device in the reservation message specifies the terminal device that the second channel is reserved for in the reserved communication period. In response to receiving the broadcast, the terminal device is capable of communicating with the gateway over the second channel in the reserved communication period.

In one or more embodiments of the present disclosure, the channel allocation method further includes the following process.

In 410, communication is conducted with the terminal device over the second channel in response to a start of the reserved communication period.

In this process, when the reversed communication period starts, that is, when the start time point of the reserved communication period arrives, the gateway 200 and the terminal device 300 start communication over the second channel.

In some embodiments, the broadcasting a reservation message over the first channel includes: broadcasting the reservation message over the first channel at a first transmit power.

The communicating with the terminal device over the second channel includes: communicating with the terminal device over the second channel at a second transmit power.

The first transmit power is greater than the second transmit power.

Herein, the signal transmit power for broadcasting the reservation message is greater than the signal transmit power for communication between the gateway and the terminal device, so as to ensure as much as possible that the reservation message of the gateway may be received by another gateway. Optionally, the first transmit power is at least 6 dBm greater than the second transmit power, so as to ensure as much as possible that the reservation message of the gateway may be received by another gateway.

In one or more embodiments of the present disclosure, the channel allocation method further includes the following process.

In 412, a message about release of the second channel is broadcast over the first channel in response to an expiration of the reserved communication period.

In this process, when the reserved communication period expires, that is, when the end time point of the reserved communication period arrives, the gateway 200 broadcasts the message about release of the second channel over the first channel to notify another gateway (for example, the gateway 210) that the gateway 200 releases the occupation of the second channel.

In some embodiments, the broadcasting a message about release of the second channel over the first channel includes: broadcasting the message about release of the second channel over the first channel at a third transmit power.

The third transmit power is greater than the second transmit power.

In some embodiments, the message about release of the second channel is broadcast over the first channel in the following way.

The message about release of the second channel s broadcast over the first channel for a plurality of times.

In this case, the channel release message is broadcast at a relatively high transmit power for a plurality of times, such that another gateway (for example, the gateway 210) in the communication range of the gateway 200 is capable of receiving the message.

As an example, the third transmit power is at least 6 dBm greater than the second transmit power, so as to ensure as much as possible that the release message of the gateway may be received by another gateway.

In some embodiments, after the message about release of the second channel is broadcast over the first channel for a plurality of times, the transmit power of the gateway 200 may be lowered to a normal signal level.

In some embodiments, after the message about release of the second channel is broadcast over the first channel for a plurality of times, the second channel may be added to the idle channel list, or the idle period of the second channel may be specified in the idle channel list.

Figure 3:
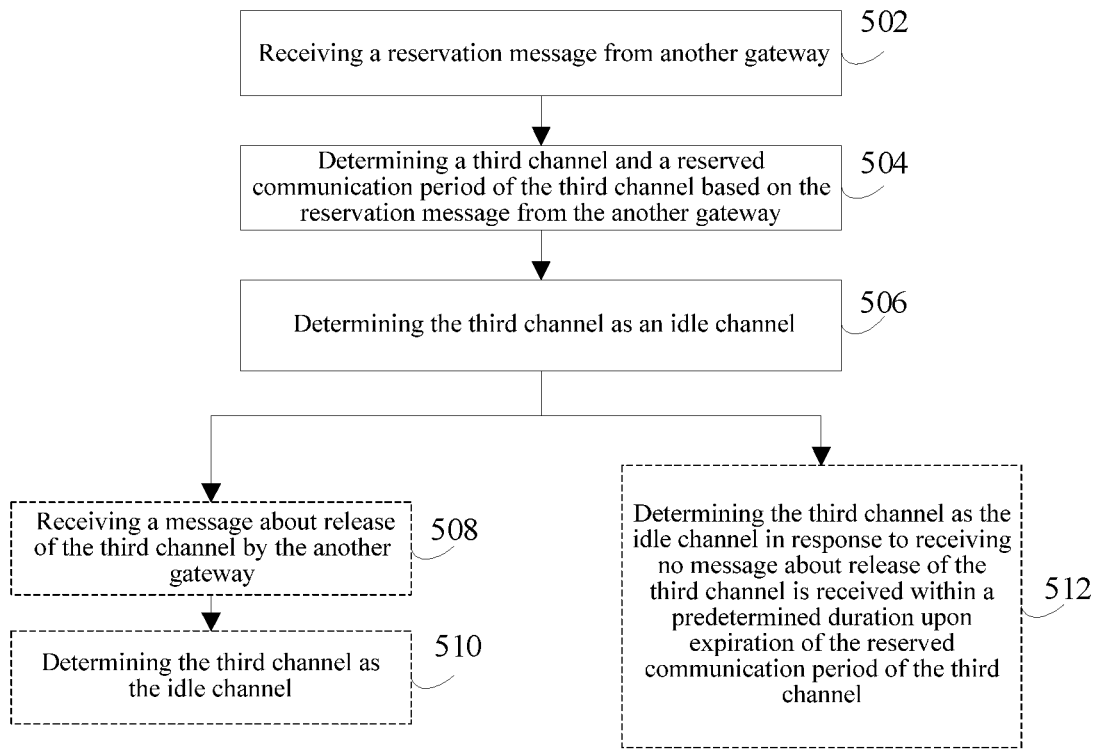
FIG. 3 is a schematic flowchart of a channel allocation method according to an embodiment of the present disclosure.

In one or more embodiments of the present disclosure, as shown in FIG. 3, the channel allocation method further includes the following processes.

In 502, a reservation message is received from another gateway.

In 504, a third channel and a reserved communication period of the third channel are determined based on the reservation message from the another gateway, wherein the third channel is occupied by the another gateway.

In 506, the third channel is determined as an idle channel.

As an example, in 506, the occupied channel may be determined as a non-idle channel in the reserved communication period, such that the occupied channel is still regarded as an idle channel in a time period beyond the reserved communication period, and therefore is reserved.

As an example, in addition to recording idle channels, the idle channel list may further record idle periods and non-idle periods of the idle channels. Alternatively, the idle channel list may further record idle periods and non-idle periods of non-idle channels. This maximizes channel utilization.

That is, in an implementation, the idle channel list includes identifiers of the idle channels, and in another implementation, the idle channel list includes at least one of an idle period and a non-idle period of each channel. The idle channel list may be updated accordingly after an idle channel, a non-idle channel, or a reserved communication period of a channel is determined.

As an example, in the idle period, if the idle period of the idle channel is selected for reservation, it may be considered to keep a certain time interval between the reserved communication period and the non-idle period to avoid signal interference caused at the boundary time point of consecutive periods. In addition, the time interval may be used for exchanging other information.

Figure 4:
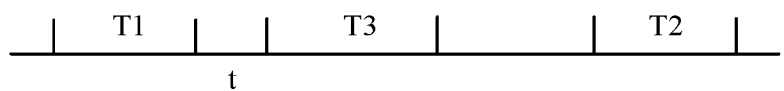
FIG. 4 is a schematic diagram of allocation of an idle period and a non-idle period of a channel in a channel allocation method according to the present disclosure.

As an example, as shown in FIG. 4, a certain channel is reserved in periods T1 and T2. In this case, when the channel needs to be reserved, for example, in a period T3, a time interval t needs to be kept between T3 and T1 to avoid signal interference caused at the boundary time point of T3 and T1. In addition, time interval t may be used for exchanging other necessary information.

In some embodiments, the channel allocation method further includes the following processes.

In 508, a message about release of the third channel by the another gateway is received.

In 510, the third channel is determined as an idle channel.

In some embodiments, the channel allocation method further includes the following process:

In 512, the third channel is determined as the idle channel in response to receiving no message about release of the third channel within a predetermined duration upon expiration of the reserved communication period of the third channel.

In this way, if a channel is occupied for a period of time that exceeds a duration threshold, the gateway automatically considers that the channel is released. This avoids channel releasing failure cause by interference or other reasons.

In some embodiments, the channel allocation method further includes: returning a reservation failure message to the terminal device in response to determining that no idle channel exists.

As an example, in response to receiving the reservation failure message, the terminal device 300 may send a new communication request to the gateway 200 after a random period of time.

It may be seen from the foregoing embodiments that, in the channel allocation methods according to the embodiments of the present disclosure, the first channel is used for handshake and channel reservation, release and synchronization when communication is initiated. The terminal device may use the first channel to perform reservation for communication at any time without following a specific time window. Upon allocating a channel, the gateway broadcasts a channel reservation message over the first channel to prevent the channel from being repeatedly allocated for nearby gateways and terminal devices, thereby avoiding signal interference. The gateway promptly releases the channel in response to a termination of the communication with the terminal device. According to this channel allocation method, the channel may be shared in communication of a plurality of gateways free of mutual interference. In the process, the gateway dynamically maintains the idle channel list (that is, a channel occupancy table).

The channel allocation methods according to the embodiments of the present disclosure are applicable to scenarios in which low-power and low-cost terminals transmit and receive large amounts of data. According to the methods, limited channel resources are efficiently utilized, a plurality of gateways are capable of dominating communication in coordination with each other in a limited space, and multi-channel communication is adopted to improve communication efficiency. In addition, the channels in the present disclosure are automatically coordinated by the gateway, and does not need to be manually grouped or coordinated together by the server. This reduces engineering difficulty.

In one or more embodiments of the present disclosure, a gateway is further provided.

The gateway includes: a communication unit, configured to communicate with a terminal device or a gateway; a memory, configured to store a set of instructions; and at least one processor, configured to execute the set of instructions to implement any embodiment or a permutation or combination of the embodiments of the channel allocation method applicable to the gateway.

In one or more embodiments of the present disclosure, a terminal device is further provided.

The terminal device includes: a communication unit, configured to communicate with a terminal device or a gateway; a memory, configured to store a set of instructions; and at least one processor, configured to execute the set of instructions to implement any embodiment or a permutation or combination of the embodiments of the channel allocation method applicable to the terminal device.

Figure 5:
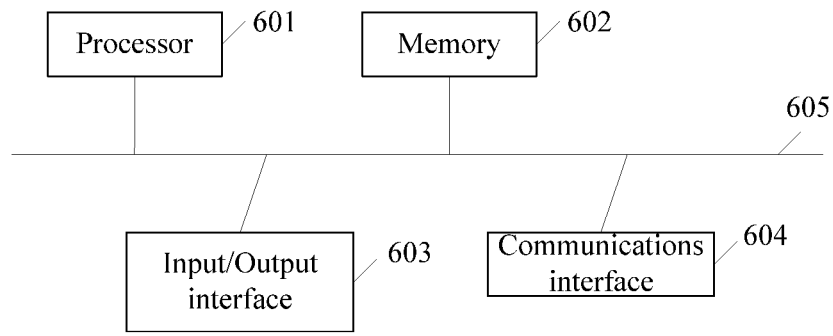
FIG. 5 is a schematic diagram of a hardware structure of an electronic device according to an embodiment of the present disclosure.

FIG. 5 is a schematic diagram of a hardware structure of an electronic device according to an embodiment. The electronic device is the foregoing gateway or terminal device. The device may include a processor 601, a memory 602, an input/output interface 603, a communication interface 604, and a bus 605. The processor 601, the memory 602, the input/output interface 603, and the communication interface 604 are communicatively connected in the device by the bus 605.

The processor 601 may be implemented in the form of a general central processing unit (CPU), a microprocessor, an application specific integrated circuit (ASIC), or one or more integrated circuits, and is configured to execute related programs to implement the technical solutions provided in the embodiments of the present disclosure.

The memory 602 may be implemented in the form of a read only-memory (ROM), a random-access memory (RAM), a static storage device, a dynamic storage device, or the like. The memory 602 may store an operating system and other application programs. When the technical solutions provided in the embodiments of the present disclosure are implemented by software or firmware, related program code is stored in the memory 602 and called and executed by the processor 601.

The input/output interface 603 is configured to connect an input/output module to implement information input and output. The input/output module may be configured in the device as a component (not shown in the figure), or may be externally connected to the device to provide corresponding functions. Input devices may include keyboards, mouses, touch screens, a microphone, various sensors, and the like. Output devices may include displays, a speakers, vibrators, indicator lights, and the like.

The communication interface 604 is configured to connect a communication module (not shown in the figure) to implement communication and interaction between the device and other devices. The communication module may implement communication in a wired manner (such as USB or network cable) or a wireless manner (such as mobile network, Wi-Fi, or Bluetooth).

The bus 605 includes a path for transmitting information between various components (such as the processor 601, the memory 602, the input/output interface 603, and the communication interface 604) of the device.

It should be noted that although only the processor 601, the memory 602, the input/output interface 603, the communication interface 604, and the bus 605 are shown for the device, in an implementation process, the device may further include other components required for normal operation. In addition, those skilled in the art may understand that the device may include only components required for implementing the solutions in the embodiments of the present disclosure, and not necessarily include all the components shown in the figure.

An embodiment of the present disclosure further provides a non-transitory computer-readable storage medium storing at least one program code. The program code, when loaded and executed by a processor, causes the processor to perform the channel allocation method shown in FIG. 2 or FIG. 3.

Described above are the specific embodiments of the present disclosure. Other embodiments also fall within the scope of the appended claims. In some cases, the actions or processes described in the claims may be performed in orders different from those in the embodiments and still achieve expected results. In addition, the processes depicted in the accompanying drawings do not necessarily require the specific orders or sequential orders shown for achieving the expected results. In some embodiments, multitasking and parallel processing are also possible or may be advantageous.

Those of ordinary skill in the art should understand that the discussion of any of the foregoing embodiments is only exemplary, and is not intended to imply that the scope of the present disclosure (including the claims) is limited to these examples. Under the idea of the present disclosure, the above embodiments or the technical features in different embodiments may also be combined, the processes may be performed in any order, and many other changes in different aspects of the present disclosure are included, which are not provided in the details for brevity.

In addition, to simplify the description and discussion without making the present disclosure difficult to understand, the well-known power/ground connections to integrated circuit (IC) chips and other components may or may not be shown in the accompanying drawings. For ease of understanding, the devices may be shown in the form of block diagrams. In addition, the details about the implementations of the devices in the block diagrams are highly dependent on the platform on which the present disclosure will be implemented (that is, these details should be fully understandable to those skilled in the art). When specific details (for example, a circuit) are provided to describe the exemplary embodiments of the present disclosure, it is obvious that those skilled in the art can implement the present disclosure without these specific details or in case of any changes to these specific details. Therefore, these descriptions should be considered illustrative rather than restrictive.

Although the present disclosure has been described with reference to the embodiments of the present disclosure, many substitutions, modifications, and variations of these embodiments will be obvious to those of ordinary skill in the art based on the foregoing description. For example, other memory architectures, for example, a dynamic RAM (DRAM), may be used in the discussed embodiments.

The present disclosure is intended to cover all such substitutions, modifications, and variations that fall within the broad scope of the appended claims. Any omissions, modifications, equivalent substitutions, improvements, and the like made within the spirit and scope of the present disclosure should fall within the protection scope of the present disclosure.

What is claimed is:

1. A channel allocation method, applicable to a gateway, the method comprising:
   determining a second channel among idle channels in response to a communication request received from a terminal device over a first channel;
   broadcasting a reservation message over the first channel, wherein the reservation message comprises second channel information and a reserved communication period;
   wherein the second channel information is information about the second channel, and the reserved communication period is a time period in which the terminal device is allowed to communicate with the gateway;
   receiving a reservation message broadcast by another gateway;
   determining a third channel and a reserved communication period of the third channel based on the reservation message broadcast by the another gateway, wherein the third channel is a channel occupied by the another gateway; and
   determining the third channel as an idle channel in response to receiving no message about release of the third channel within a predetermined duration upon expiration of the reserved communication period of the third channel.

2. The method according to claim 1, further comprising: returning the reservation message to the terminal device over the first channel.

3. The method according to claim 1, wherein the reservation message comprises an identifier of the terminal device.

4. The method according to claim 1, further comprising: communicating with the terminal device over the second channel in response to a start of the reserved communication period.

5. The method according to claim 4, wherein broadcasting the reservation message over the first channel comprises: broadcasting the reservation message over the first channel at a first transmit power; and
   communicating with the terminal device over the second channel comprises:
   communicating with the terminal device over the second channel at a second transmit power;
   wherein the first transmit power is greater than the second transmit power.

6. The method according to claim 5, wherein the first transmit power is at least 6 dBm greater than the second transmit power.

7. The method according to claim 5, further comprising: broadcasting a message about release of the second channel over the first channel in response to an expiration of the reserved communication period.

8. The method according to claim 7, wherein broadcasting the message about release of the second channel over the first channel comprises: broadcasting the message about release of the second channel over the first channel at a third transmit power;
   wherein the third transmit power is greater than the second transmit power.

9. The method according to claim 8, wherein the third transmit power is at least 6 dBm greater than the second transmit power.

10. The method according to claim 7, wherein broadcasting the message about release of the second channel over the first channel comprises:

broadcasting the message about release of the second channel over the first channel for a plurality of times.

11. The method according to claim 1, wherein broadcasting the reservation message over the first channel comprises:
broadcasting the reservation message over the first channel for a plurality of times.

12. The method according to claim 1, further comprising:
updating an idle channel list, wherein the idle channel list records one of:
an identifier of an idle channel; or
at least one of an idle period and a non-idle period of each channel.

13. The method according to claim 1, wherein before determining the second channel among idle channels, the method further comprises:
determining whether an idle channel exists currently; and
returning a reservation failure message to the terminal device in response to determining that no idle channel exists.

14. A gateway, comprising:
a memory, configured to store at least one program code; and
at least one processor, configured to execute the program code to perform a method comprising:
determining a second channel among idle channels in response to a communication request received from a terminal device over a first channel;
reserving the second channel, and returning second channel information and a reserved communication period to the terminal device;
broadcasting a reservation message over the first channel, wherein the reservation message comprises the second channel information and the reserved communication period; wherein the second channel information is information about the second channel, and the reserved communication period is a time period in which the terminal device is allowed to communicate with the gateway;
receiving a reservation message broadcast by another gateway;
determining a third channel and a reserved communication period of the third channel based on the reservation message broadcast by the another gateway, wherein the third channel is a channel occupied by the another gateway; and
determining the third channel as an idle channel in response to receiving no message about release of the third channel within a predetermined duration upon expiration of the reserved communication period of the third channel.

15. A non-transitory computer-readable storage medium storing at least one program code therein, wherein the program code, when loaded and executed by a processor, causes the processor to perform:
determining a second channel among idle channels in response to a communication request received from a terminal device over a first channel;
broadcasting a reservation message over the first channel, wherein the reservation message comprises second channel information and a reserved communication period;
wherein the second channel information is information about the second channel, and the reserved communication period is a time period in which the terminal device is allowed to communicate with the gateway;
receiving a reservation message broadcast by another gateway;
determining a third channel and a reserved communication period of the third channel based on the reservation message broadcast by the another gateway, wherein the third channel is a channel occupied by the another gateway; and
determining the third channel as an idle channel in response to receiving no message about release of the third channel within a predetermined duration upon expiration of the reserved communication period of the third channel.

* * * * *